US010486832B2

(12) United States Patent
Abelon et al.

(10) Patent No.: US 10,486,832 B2
(45) Date of Patent: Nov. 26, 2019

(54) COMMERCIAL AIRCRAFT INTERIOR MONUMENT PROTECTION SYSTEM

(71) Applicant: The Boeing Company, Chicago, IL (US)

(72) Inventors: Ryan Nelson Marcelo Abelon, Bothell, WA (US); Cory M. Hitchcock, Granite Falls, WA (US); Toai Dac Tran, Monroe, WA (US); Thomas Ralph Smith, Jr., Cocoa, FL (US); Jon Burton Shaw, Everett, WA (US)

(73) Assignee: The Boeing Company, Chicago, IL (US)

( * ) Notice: Subject to any disclaimer, the term of this patent is extended or adjusted under 35 U.S.C. 154(b) by 512 days.

(21) Appl. No.: 15/092,428

(22) Filed: Apr. 6, 2016

(65) Prior Publication Data
US 2017/0291725 A1  Oct. 12, 2017

(51) Int. Cl.
*B64F 5/50* (2017.01)
*B64F 5/10* (2017.01)
*B64D 11/00* (2006.01)

(52) U.S. Cl.
CPC ............... *B64F 5/50* (2017.01); *B64F 5/10* (2017.01); *B64D 2011/0046* (2013.01); *Y02T 50/46* (2013.01)

(58) Field of Classification Search
CPC ......... Y10T 29/49826; Y10T 29/49947; Y10T 29/49948; Y10T 29/49966; A41B 13/106; A47G 9/04; B64F 5/50; B64F 5/10; Y02T 50/46; B64D 2011/0046

USPC ....... 29/525.01, 525.02, 552.03, 525.13, 428
See application file for complete search history.

(56) References Cited

U.S. PATENT DOCUMENTS

| 4,890,885 | A | * | 1/1990 | Grossmann | A47C 27/086 297/284.1 |
|---|---|---|---|---|---|
| 6,019,421 | A | * | 2/2000 | Roh | A47C 29/006 297/184.13 |
| 6,199,252 | B1 | * | 3/2001 | Masters | B60N 2/0224 29/91.1 |
| 8,146,984 | B2 | | 4/2012 | Devereaux | |
| 9,155,397 | B2 | * | 10/2015 | D'Amato | A47C 7/66 |
| 2002/0113458 | A1 | * | 8/2002 | Heiland | B60J 11/00 296/136.01 |
| 2007/0179864 | A1 | * | 8/2007 | Leeds | A47C 7/021 705/14.27 |
| 2008/0310094 | A1 | * | 12/2008 | Burns | A45C 13/00 361/679.01 |

(Continued)

OTHER PUBLICATIONS

Examiner's web search history; Mar. 15, 2019 (Year: 2019).*

(Continued)

*Primary Examiner* — Sarang Afzali
*Assistant Examiner* — Darrell C Ford
(74) *Attorney, Agent, or Firm* — Yee & Associates, P.C.

(57) ABSTRACT

A method of protecting a monument during manufacturing of a vehicle. The method includes attaching a plurality of brackets to the monument prior to installation in the vehicle, each of the plurality of brackets having corresponding fasteners facing outwardly relative to the monument. The method also includes connecting a blanket to the corresponding fasteners. The method also includes installing the monument in the vehicle, disconnecting the blanket, and removing the plurality of brackets from the monument.

11 Claims, 13 Drawing Sheets

(56) References Cited

U.S. PATENT DOCUMENTS

| | | | | |
|---|---|---|---|---|
| 2009/0151827 | A1* | 6/2009 | Thompson | B60J 11/06 150/154 |
| 2010/0282902 | A1* | 11/2010 | Rajasingham | B60N 2/01 244/118.6 |
| 2011/0011762 | A1* | 1/2011 | Hurst | B65D 33/2591 206/326 |
| 2011/0067802 | A1* | 3/2011 | Wener | B65D 65/10 156/184 |
| 2014/0359934 | A1* | 12/2014 | Schliwa | B64D 11/02 4/664 |
| 2015/0115100 | A1* | 4/2015 | Schliwa | B64D 11/003 244/118.1 |
| 2015/0291071 | A1* | 10/2015 | Thompson | B60N 2/6036 297/228.13 |
| 2018/0029715 | A1* | 2/2018 | Larabie | B64D 11/0639 |

OTHER PUBLICATIONS

Removal/Installation of Passenger Seat on the King Air B300/B300C—Beechcraft, https://www.youtube.com/watch?v=yfkzZcXmziQ , published May 13, 2015 (Year: 2015).*

Stenberg, "Aircraft Interior Protection System," U.S. Appl. No. 13/948,555, filed Jul. 23, 2013, 41 pages.

"Class 0 12×12 Insulating Blanket with Velcro," Protective Equipment Testing Laboratory, copyright 2005, 1 page, accessed Jun. 26, 2013. http://xpresscartcentral.com/petl/closeup.asp?cid=140&pid=987&offset=0.

"Class 4 18×36 Insulating Blanket with Velcro," Protective Equipment Testing Laboratory, copyright 2005, 1 page, accessed Jun. 26, 2013. http://xpresscartcentral.com/petl/closeup.asp?cid=140&pid=199&offset=0.

"Pyro Shield/Heat Blankets/Needle Mats/Furnace Modules," Pyro Shield, Inc., copyright 2011, 2 pages, accessed Jun. 26, 2013. http://www.pyroshield.com/index.php?option=com_content&view=article&id=26.

* cited by examiner

COMMERCIAL AIRCRAFT INTERIOR MONUMENT PROTECTION SYSTEM

BACKGROUND INFORMATION

1. Field

The present disclosure relates to protection of monuments during a manufacturing process. In particular, the present disclosure relates to the protection of monuments during assembly and manufacturing of commercial aircraft.

2. Background

Aircraft manufacturers may use monuments during the assembly and manufacturing of commercial aircraft. A monument is defined as an assembled structure that is to be placed as a whole into the interior of an aircraft during manufacture. Typically, monuments are manufactured by third party vendors, or perhaps by other departments of an aircraft manufacturing company, and then moved to the assembly line where aircraft are being assembled and manufactured. The monuments are then installed into an aircraft at the appropriate stage along the assembly line.

Monuments are often expensive. Some monuments may costs hundreds of thousands of dollars. Thus, an aircraft manufacturer will take care while moving monuments during manufacturing so that they are not subject to cosmetic or functional inconsistencies. However, monuments are typically heavy; some may weigh hundreds of pounds, sometimes making them difficult to move without damaging them.

SUMMARY

The illustrative embodiments provide for a method of protecting a monument during manufacturing of a vehicle. The method includes attaching a plurality of brackets to the monument prior to installation in the vehicle, each of the plurality of brackets having corresponding fasteners facing outwardly relative to the monument. The method also includes connecting a blanket to the corresponding fasteners. The method also includes installing the monument in the vehicle, disconnecting the blanket, and removing the plurality of brackets from the monument.

The illustrative embodiments also provide for a monument protection system installable on a monument that includes connection mounts, the monument installable as a structure in an aircraft. The monument protection system includes a first plurality of brackets installable on corresponding ones of the connection mounts, the first plurality of brackets including corresponding indexing features installable into corresponding ones of the connection mounts, and further including corresponding hanging projections configured to hang blankets, the corresponding hanging projections disposed opposite the corresponding indexing features relative to each other. The monument protection system also includes a plurality of blankets including corresponding hanging features on corresponding edges of the plurality of blankets, the hanging features connectable to the corresponding hanging projections.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
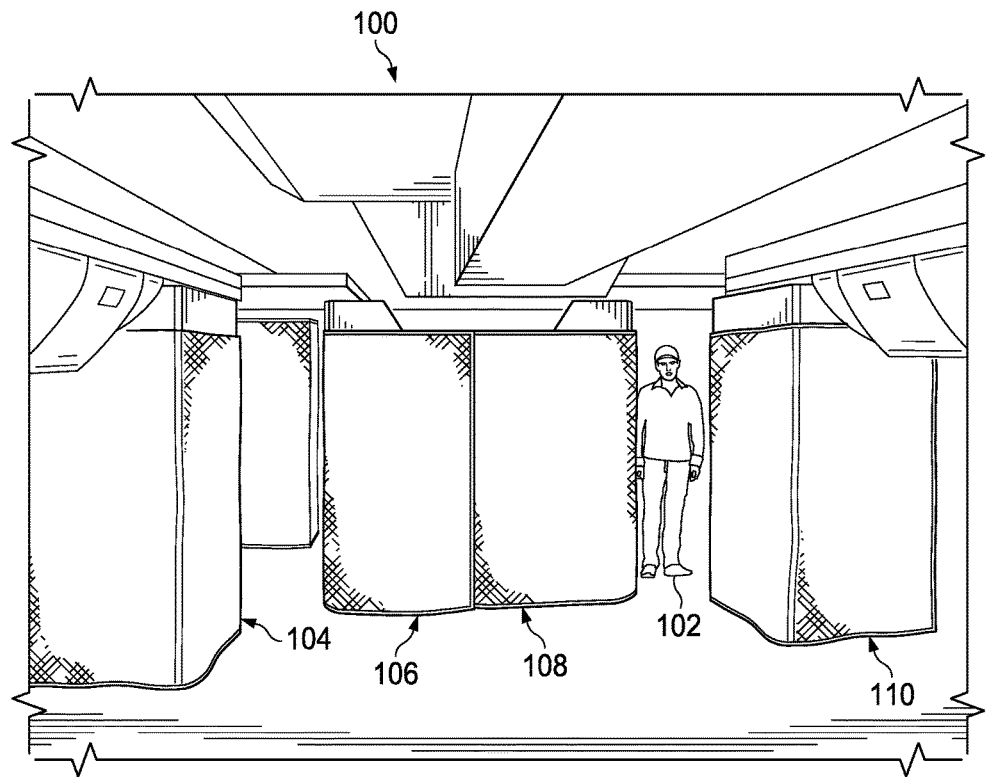
FIG. 1 illustrates an aircraft manufacturing environment including monuments, in accordance with an illustrative embodiment.

The illustrative embodiments recognize and take into account that monuments are sometimes expensive and heavy, making protecting them during movement and installation both desirable and difficult. In some cases, blankets may be placed around a monument so that the monument is protected in case something bumps against it during transport prior to installation.

One technique to protect a monument is to wrap the sides of a monument in one or more blankets. However, as the monuments are typically not designed to hang or hold blankets, techniques are provided to attach the blanket or blankets to a monument.

One such technique is to apply tape or other adhesive to a monument. The blanket is then attached to the tape or other adhesive. However, this process is time consuming and can generate a large amount of wasted tape. Time is used both applying the tape, and taking the tape off just prior to monument installation. The illustrative embodiments recognize and take into account these difficulties.

One technique for addressing this difficulty is to apply a hook and loop fastening system to the tape and then hang blankets already having a complementary hook and loop fastening system to the monument accordingly. However, this alternative technique still requires taping and then removing tape from the monument. When hundreds or thousands of monuments in a major manufacturing facility are being processed, this process may be an undesirable waste of time, material, and money.

Thus, the illustrative embodiments generally provide for a system of nodal bracketry interconnected by modular links to support a hook and loop fastener interface for insulation blankets with a mating hook and loop fastener interface. An example of a hook and loop fastener is VELCRO®, though other hook and loop fastener systems may be used. Thus, the illustrative embodiments provide for a system of temporary bracketry designed for selected node points of monuments in an aircraft. Monuments may include dividers, closets, lavatories, galleys, and many others.

The node points may be placed in the uppermost corners of the monument. Since protective blankets tend to hang with the force of gravity it, providing bottom brackets is not always necessary or desirable.

The nodal brackets could be at additional locations such that a system of links may provide connection between the brackets. The outer surface of the brackets and links may include a hook and loop fastener material. This system may serves as a temporary mechanical interface which may be easily and quickly added to and then removed from a monument.

Thus, the illustrative embodiments provide for a blanket system for a monument. The blanket system may include a number of brackets, a number of modular links, a number of side fastening strips, and a number of blankets with a number of attached second side fastening strips.

The illustrative embodiments also provide for a method of protecting a monument installed in a vehicle. The method may include attaching a number of brackets to the monument prior to installation in the vehicle, installing the monument in the vehicle, and installing at least one modular link to at least one of the number of brackets. The number of brackets and the modular links may have, on first sides, connection material connected to them. The method may also include connecting a number of protective blankets to the first sides connection material via second sides connection material integral to the blanket. Thereafter the method may include disconnecting the number of protective blankets and removing the brackets and installing a decorative portion in its place for fly-away.

The illustrative embodiments also recognize and take into account that the bracketry could mechanically secure to a structural feature normally covered by a "rub strip" edge material of the typically honeycomb core composite sandwich panels. The bracketry and links may be entirely modular such that any monument can be framed by these brackets and links depending on the combination of brackets and links used. The illustrative embodiments provide for bringing a monument to the airplane for installation having brackets already installed on it and bracket removal taking place after installation of the monument in the airplane. In this manner, the speed, expense, and safety of monument installation are all improved.

The illustrative embodiments contemplate that the techniques disclosed herein are not limited to aircraft manufacturing. The illustrative embodiments described herein may be used in any system for protecting objects during a manufacturing process. Thus, references to aircraft, monuments, and aircraft manufacturing do not necessarily limit the illustrative embodiments described herein. For example, the illustrative embodiments may also apply in some cases to construction of military aircraft manufacturing or automobile manufacturing where parts are to be protected during transport and installation. The illustrative embodiments may also apply to other manufacturing environments in which large objects are to be protected at least temporarily.

FIG. 1 illustrates an aircraft manufacturing environment including monuments, in accordance with an illustrative embodiment. Aircraft manufacturing environment 100 is depicted inside a partially constructed interior of a fuselage of a commercial aircraft. Again, as mentioned above, the illustrative embodiments are not necessarily limited to a commercial aircraft manufacturing environment.

Aircraft manufacturing environment 100 shows engineer 102 engaged in the installation of monuments, including monument 104, monument 106, monument 108, and monument 110. Other monuments may be present, as well as other manufacturing equipment and accessories, as shown. In the illustrative embodiment shown in FIG. 1, each of these monuments was manufactured at a separate facility, was transported to the aircraft assembly line, and now is to be installed in the commercial aircraft. Thus, for example, monument 104 and monument 110 have been installed in their final position. Monument 106 and monument 108 have been moved onto the floor of the aircraft interior, but have yet to be moved into position.

The monuments are typically protected by blankets during movement and installation, though other protection materials might be used. As shown in FIG. 1, each of the monuments is wrapped at least partially in one or more blankets. Typically the blankets are hung from locations near the tops of the monuments, and hang to or near the bottoms of the monuments. Typically, the tops of the monuments are not protected by blankets, though in other illustrative embodiments blankets may be placed on the tops of the monuments.

These blankets help to protect the monuments from physical or cosmetic inconsistencies during transport and installation. However, typically these blankets are not supplied with the monument before the monument is delivered to the aircraft assembly line. Thus, engineer 102 may be tasked with attaching the blankets to the monuments, and then after installation, removing the blankets from the monuments.

The time to add and remove blankets may be considerable, representing man-days or even man-weeks of time. Additionally, if tape is used to secure a hook and loop fastener system to the monuments to complement another hook and loop fastener system already on the blankets, the process may use vast quantities of tape. This process may be painstaking, slow, and costly.

The illustrative embodiments address these issues by providing a blanket installation system. The blanket installation system of the illustrative embodiments dramatically speeds up the addition and removal of blankets to and from monuments during the transport and installation process. Testing of the blanket installation system has suggested an average savings of 27 man-hours per aircraft and the near elimination of tape use for purposes of blanket installation on monuments. Both of these advantages save a significant amount of money.

Figure 2:
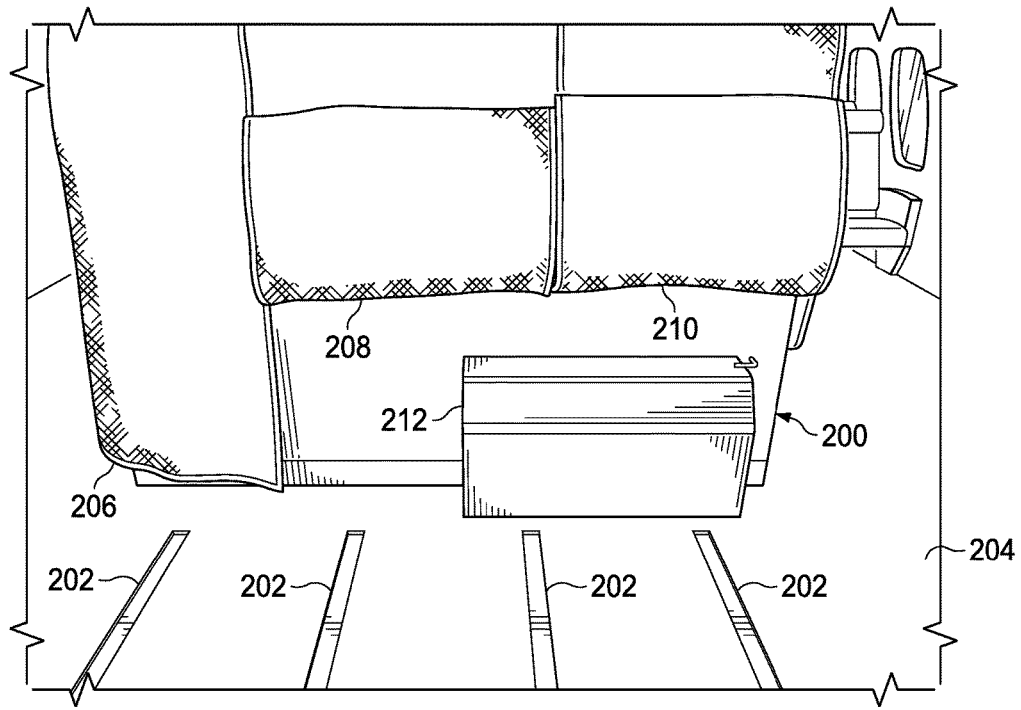
FIG. 2 illustrates installation of a monument into an interior of an aircraft, in accordance with an illustrative embodiment.

FIG. 2 illustrates installation of a monument into an interior of an aircraft, in accordance with an illustrative embodiment. The installation process described with respect to FIG. 2 may take place in aircraft manufacturing environment 100 of FIG. 1.

In FIG. 2, monument 200 is being installed via rails 202 on floor 204 of the interior of a fuselage of an aircraft. Several blankets are hung from the top of monument 200 to protect the monument during movement and installation, including blanket 206, blanket 208, and blanket 210. Other blankets may be wrapped around sides of monument 200 that are not shown in FIG. 2. During installation, one or more blankets such as blanket 208 and blanket 210, may be partially folded upwardly or inwardly to make room for equipment used during installation of monument 200, such as device 212.

Figure 3:
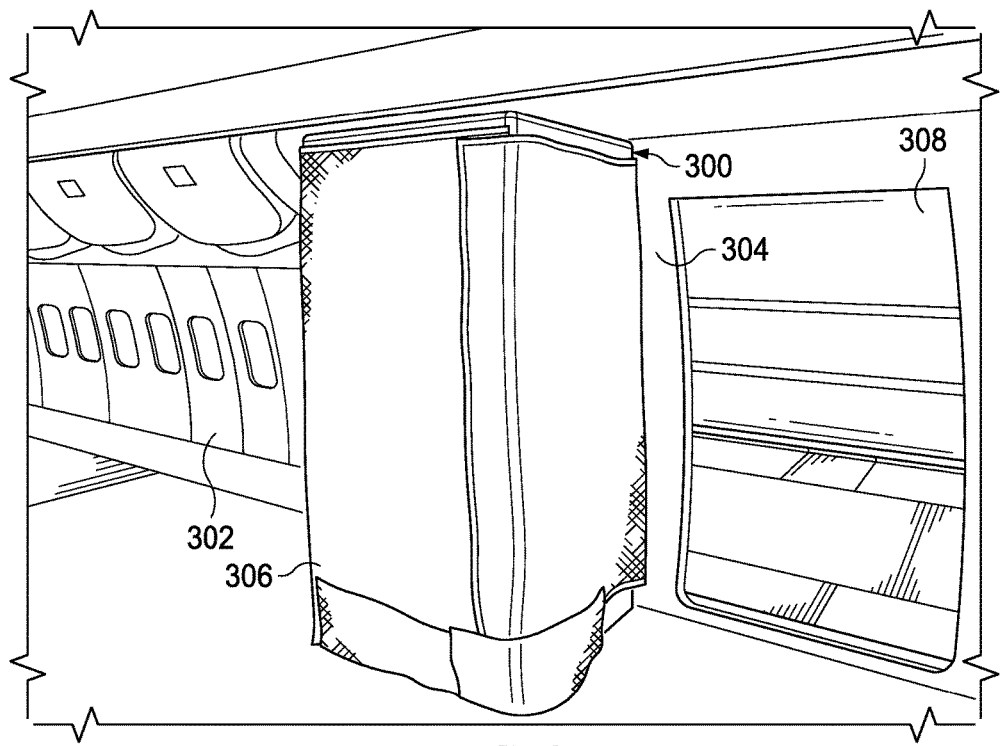
FIG. 3 illustrates a monument protected by blankets, in accordance with an illustrative embodiment.

FIG. 3 illustrates a monument protected by blankets, in accordance with an illustrative embodiment. Monument 300 may be installed in a manufacturing environment such as aircraft manufacturing environment 100 of FIG. 1. Doorway 302 and fuselage wall 304 are shown for reference. Also for reference, a second fuselage of another aircraft 308 under construction on an assembly line in a manufacturing facility is shown.

FIG. 3 shows how one or more blankets, such as blanket 306, are hung from near the top of monument 300 in order to protect monument 300 during installation. As can be seen in FIG. 3, in some cases the monument may be fully installed before blanket 306 is removed from monument 300. In other illustrative embodiments, if desired, blanket 306 may be removed just prior to installing monument 300.

Figure 4:
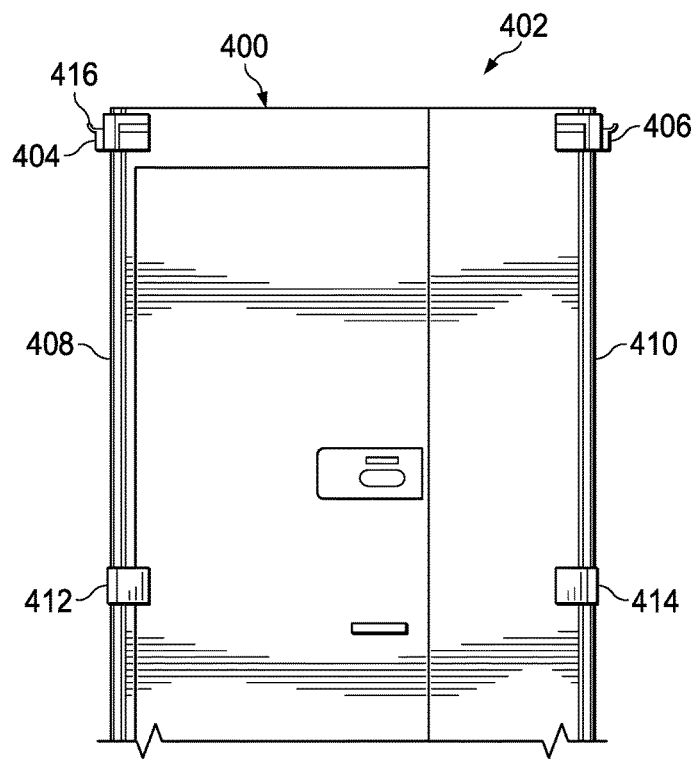
FIG. 4 illustrates a monument fitted with a monument protection system, in accordance with an illustrative embodiment.

FIG. 4 illustrates a monument fitted with a monument protection system, in accordance with an illustrative embodiment. Monument 400 may be any of the monuments described with respect to FIG. 1 through FIG. 3 and may be used in an aircraft manufacturing environment such as aircraft manufacturing environment 100 of FIG. 1. In the illustrative embodiment shown in FIG. 4, monument 400 is a lavatory. However, monument 400 could be any type of monument or object to be protected during transport and installation.

Monument protection system 402 may include several brackets which may be removably attached to corners of the monument. The outwardly facing surfaces of the brackets may be fitted with a first side of a hook and loop fastener. The blankets, in turn (such as those shown in FIG. 1 through FIG. 3) are provided with a second side of the hook and loop fastener such that the blankets may be quickly attached to and removed from the brackets.

A minimum of one bracket may be used to hang a blanket. However, in an illustrative embodiment, it may be preferable to provide brackets on multiple corners of monument 400 so that the blanket hangs evenly. Thus, for example, monument protection system 402 may include bracket 404 and bracket 406 installed on opposite corners of monument 400 with respect to a face of monument 400.

In an illustrative embodiment, bracket 404 may be installed onto rail 408, which in this illustrative embodiment is grooved to receive bracket 404. Likewise, bracket 406 may be installed onto rail 410, which in this illustrative embodiment is grooved to receive bracket 406. While these rails are shown as installed in the corners of monument 400 from the top to the bottom of monument 400, the rails need not extend the height of monument 400.

However, if rail 408 and rail 410 extend the height of monument 400, then bracket 404 and bracket 406 may be installed at any desirable height with respect to monument 400. Additionally, with this arrangement, one or more additional brackets may be provided to secure more strongly the blanket to monument 400. For example, bracket 412 could be installed below bracket 404 on rail 408, and bracket 414 could be installed below bracket 406 on rail 410. Again, the outside faces of bracket 412 and bracket 414 may be provided with a one side of a hook and loop fastener system configured to receive another side of the hook and loop fastener system that is installed on the blanket or blankets.

The illustrative embodiments described with respect to monument 400 are not necessarily limiting. In an illustrative embodiment, each of the brackets shown in FIG. 4 wraps around the corners. In this manner, each bracket may provide a support surface for hanging one or more blankets on two sides of monument 400. However, in another illustrative embodiment, and as shown below, in some cases it may be desirable that the bracket only is attached to one side of monument 400. In still other illustrative embodiments a rail or bar may be connected between brackets, as also shown further below. In yet other illustrative embodiments, a grooved rail may extend horizontally across monument 400 instead of vertically at a corner, and a bracket may be installed in this case anywhere along a length of monument 400.

In still another illustrative embodiment, the brackets need not be provided with a hook and loop fastener system, but may be provided with projections, such as projection 416 from bracket 404. In this case, a rod may rest inside projection 416 and be supported by a complementary projection on another bracket on a same side of monument 400. The rod may extend through a loop in the blanket, thereby supporting the blanket as it hangs from near the top of monument 400.

In still further illustrative embodiments, monument protection system 402 may include both the projections and a hook and loop fastener system, or may use a combination of different brackets. For example, a bracket, such as bracket 404, may include both a projection and a hook and loop fastener system. In another example, bracket 404 may include a projection and bracket 412 may include a hook and loop fastener system.

In still other illustrative embodiments, different means for securing the blanket to a bracket could be used. For example, a glue or tape could be installed on the brackets. In another example, projections could extend outwardly from the brackets, to be received into grommets or button holes provided in the blankets. Thus, the illustrative embodiments are not necessarily limited by the illustrative embodiments shown in FIG. 4.

Figure 5:
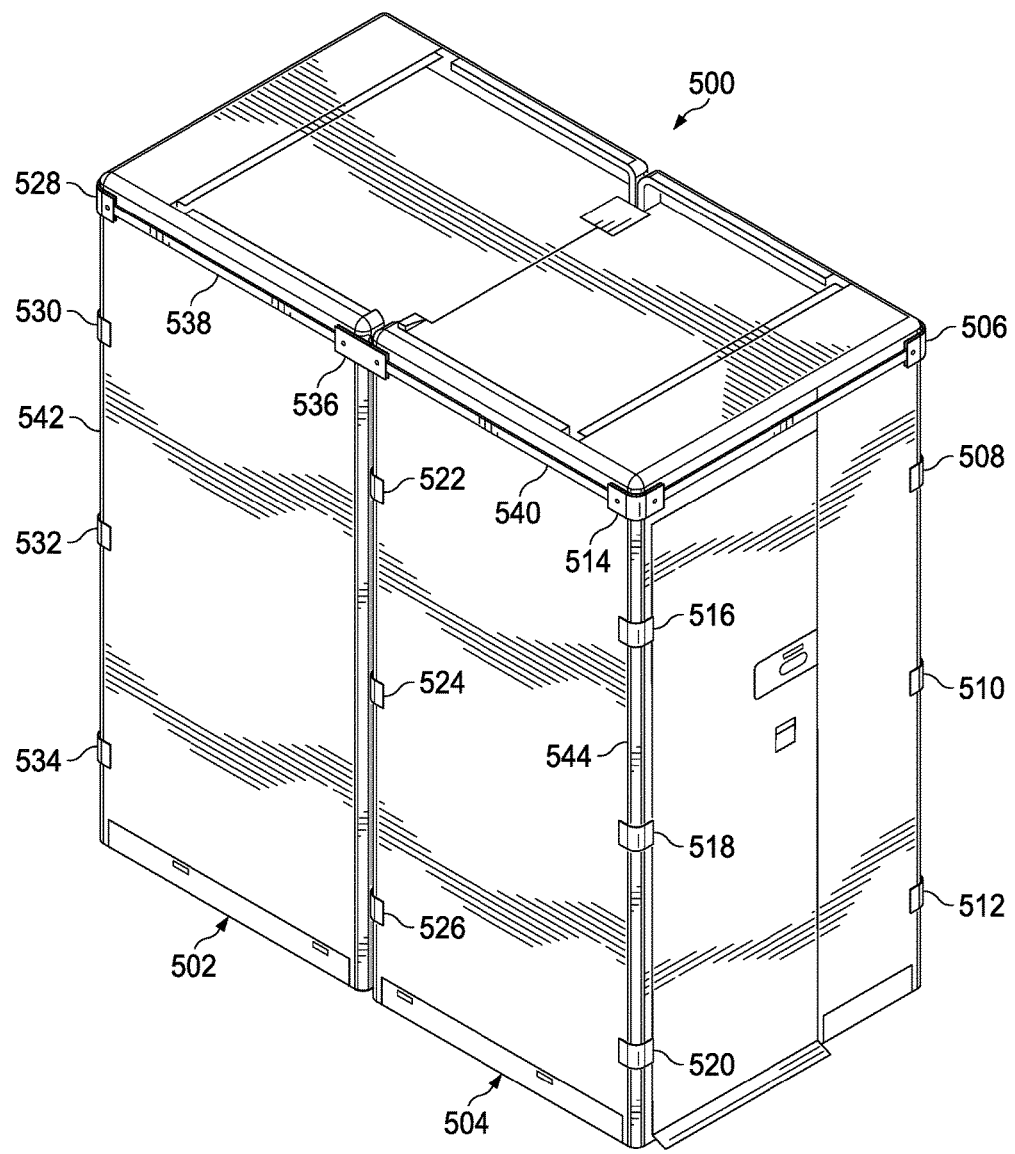
FIG. 5 illustrates two adjacent monuments fitted with another monument protection system, in accordance with an illustrative embodiment.

FIG. 5 illustrates two adjacent monuments fitted with another monument protection system, in accordance with an illustrative embodiment. Monument protection system 500 may be an alternative or a complementary system to monument protection system 402 shown in FIG. 4.

FIG. 5 shows two monuments, monument 502 and monument 504. In this illustrative embodiment, these two monuments may be transported and installed together. Alternatively, these two monuments may be transported and received separately, and then installed separately. In this case the protection system disclosed herein would then be applied after the monuments are installed adjacent to each other.

In this particular illustrative embodiment, multiple corner brackets such as those shown in FIG. 4 are present on the corners of these two monuments. Thus, for example, monument protection system 500 includes bracket 506, bracket 508, bracket 510, bracket 512, bracket 514, bracket 516, bracket 518, bracket 520, bracket 522, bracket 524, bracket 526, bracket 528, bracket 530, bracket 532, and bracket 534 all of which may be corner brackets. Each of these brackets may have outward faces fitted with one side of a hook and loop fastener system, or may be provided with some other mechanism for securing one or more blankets, as described above.

To provide additional blanket support, monument protection system 500 may also include longitudinal bracket 536. Longitudinal bracket 536 may be provided between the two monuments at adjoining top corners. Longitudinal bracket 536 bridges monument 502 and monument 504, extending at least partially across both. Longitudinal bracket 536 may be supported by one or more rails, such as rail 538 and rail 540.

In an illustrative embodiment, these rails may extend from corresponding corner brackets on each monument. Thus, for example, rail 538 may connected to bracket 528 and longitudinal bracket 536. Likewise, rail 540 may connect to bracket 514 and longitudinal bracket 536. In this manner, longitudinal bracket 536 may be supported or, in the case that longitudinal bracket 536 is independently supported on one or both monuments, may receive extra support. Alternatively or in addition, rail 538 and rail 540 may have outward faces that are provided with a hook and loop fastener or other type of fastener from which one or more blankets may be secured in a manner described above.

Any of the brackets shown in FIG. 5 may be attached to a rail, such as rail 542 or rail 544. These rails may correspond to rail 408 or rail 410 of FIG. 4. In this manner the brackets may be attached to the corresponding monument.

Figure 8:
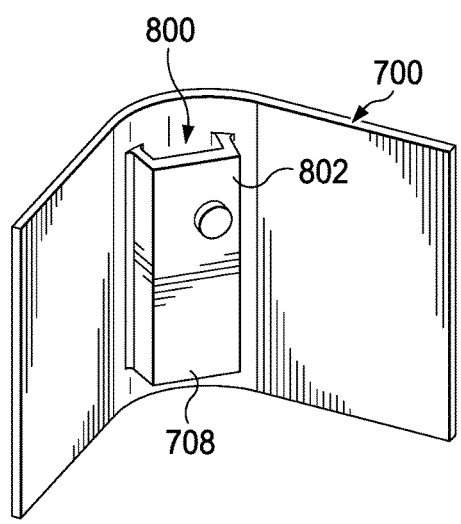
FIG. 8 illustrates another view of the monument bracket used in FIG. 7, in accordance with an illustrative embodiment.

The illustrative embodiments shown with respect to FIG. 5 include an example of "wherein the plurality of brackets include a first bracket installable on a corner of the monument, the first bracket comprising two straight sections joined by a curved section, an indexing feature disposed on an inside of the curved section, and two corresponding hanging features disposed at a first edge of the first bracket, and wherein attaching the plurality of brackets comprises attaching the indexing feature to a connection mount disposed on a corner of the monument." The plurality of brackets may be bracket 506, bracket 508, bracket 510, bracket 512, bracket 514, bracket 516, bracket 518, bracket 520, bracket 522, bracket 524, bracket 526, bracket 528, bracket 530, bracket 532, and bracket 534. In this example the "first bracket" could be bracket 514, as it has two straight sections abutting the straight sides of monument 502 joined by a curved section that wraps around the corner of monument 502. An indexing feature, such as shown in FIG. 8, may be disposed on an inside of the curved section; that is, the side facing the corner of monument 502. Examples of hanging features are shown at curved rail 1016 of FIG. 10.

Figure 6:
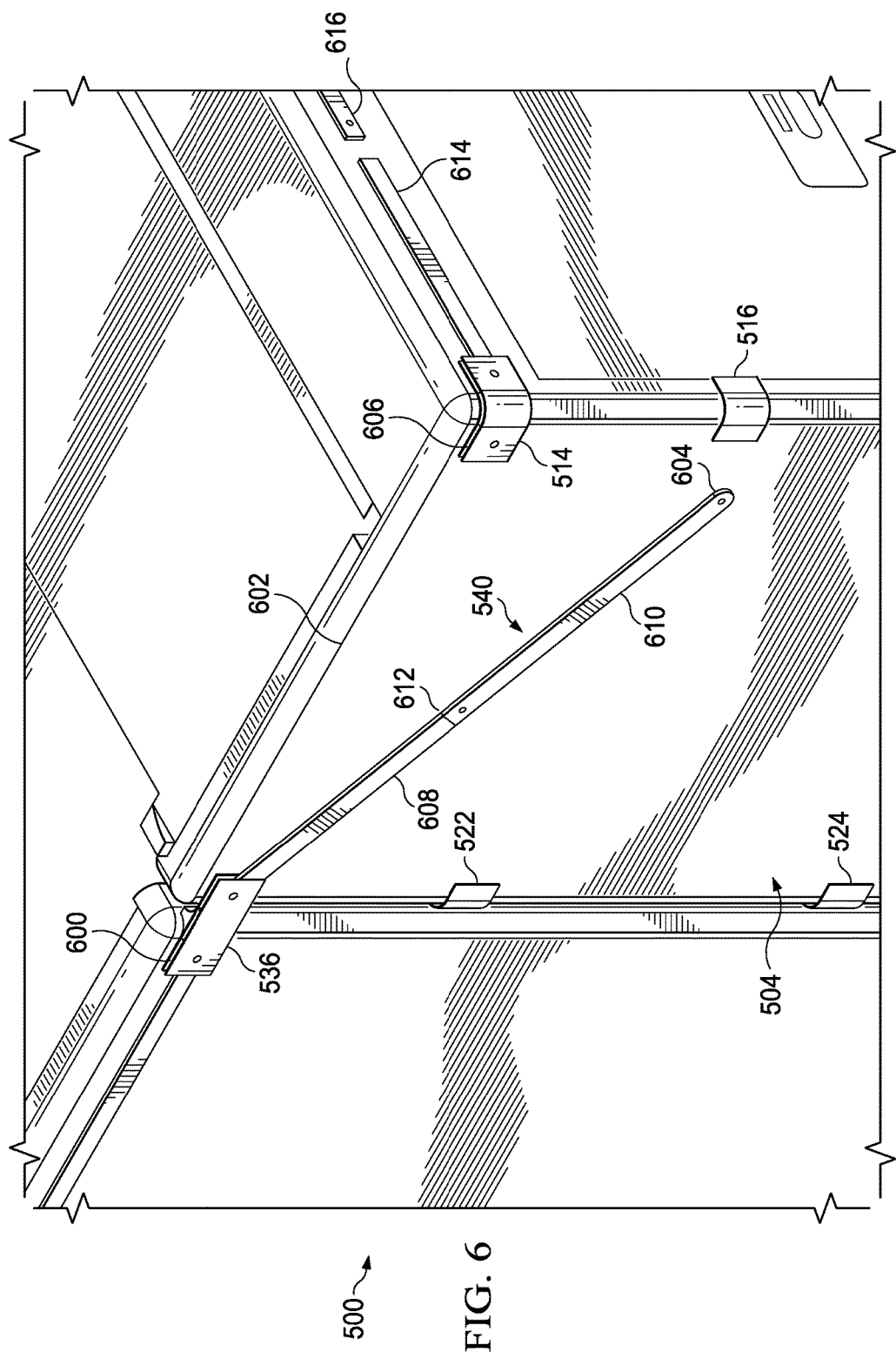
FIG. 6 illustrates a close up view of the monument protection system shown in FIG. 5, in use, in accordance with an illustrative embodiment.

FIG. 6 illustrates a close up view of the monument protection system shown in FIG. 5, in use, in accordance with an illustrative embodiment. Specifically, FIG. 6 shows a close-up view of the top of the monuments described with respect to FIG. 5, and details of monument protection system 500 of FIG. 5. Thus, FIG. 6 also is presented to describe monument protection system 500 of FIG. 5. Accordingly, reference numerals common to FIG. 5 and FIG. 6 have similar names and descriptions.

FIG. 6 specifically shows one method for securing rails, such as rail 540, to brackets, such as longitudinal bracket 536 and bracket 514. In an illustrative embodiment, longitudinal bracket 536 includes grooves, such as groove 600. Rail 540 may fit into groove 600, thereby creating a tension fit between longitudinal bracket 536 and rail 540. In an illustrative embodiment, some other securing device such as a snap or slot may be present inside longitudinal bracket 536 to further secure rail 540 within longitudinal bracket 536.

In FIG. 6, rail 540 is shown as being at an angle with respect to top edge 602 of monument 504. This angle is shown in order to illustrate that rail 540 may be fitted in longitudinal bracket 536 at an angle and then rotated through an angle such that end 604 of rail 540 may fit into slot 606 of bracket 514. In this manner, rail 540 may be secured to both longitudinal bracket 536 and bracket 514, and ultimately may extend horizontally between them.

These illustrative embodiments may be varied. For example, rail 540 may include two components, rail segment 608 and rail segment 610. These two rail segments may be joined at rail joint 612. In an illustrative embodiment the fit between the two rail segments may also be a tension fit, but in other illustrative embodiments may be secured by other methods. In this manner, the various components used to build monument protection system 500 may be modular. In other words, a provider may provide the various brackets and rail segments described herein as uniform components so that engineer 102 of FIG. 1 may fit monument protection system 500 to any particular monument or monuments.

As shown in FIG. 6, additional rails may be provided relative to FIG. 5. For example, rail segment 614 may also extend from bracket 514. Rail segment 614 may also connect to rail segment 616, and from there fit into an opposing corner bracket (not shown). Thus, the illustrative embodiments are not necessarily limited by the examples shown in FIG. 6.

Figure 7:
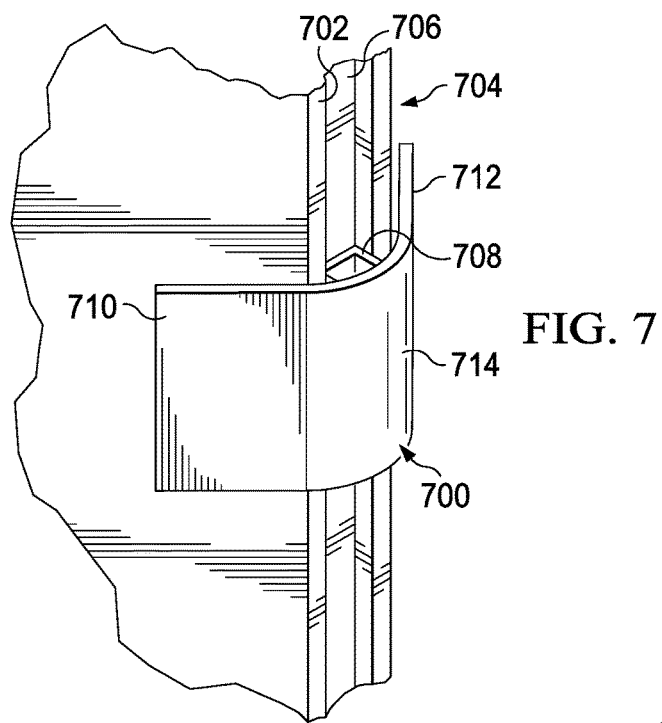
FIG. 7 illustrates a close up view of a bracket for a monument protection system, in accordance with an illustrative embodiment.

FIG. 7 illustrates a close up view of a bracket for a monument protection system, in accordance with an illustrative embodiment. Specifically, FIG. 7 shows a close up view of corner bracket 700, which may be bracket 514 of FIG. 5 and FIG. 6. Likewise, slotted rail 702 may be rail 408 or rail 410 of FIG. 4.

One method of securing corner bracket 700 to monument 704 is to provide slotted rail 702 with slot 706. Slotted rail 702 may come pre-manufactured as part of monument 704, or in some cases, slotted rail 702 may be added to monument 704. In either case, corner boss 708 on the inside corner surface of corner bracket 700 may form a tension fit inside slot 706. Preferably the tension fit is strong enough to hold the weight of a blanket, but weak enough to allow an engineer to add remove corner bracket 700 when desired.

The shape of corner bracket 700 may be as shown in FIG. 7. This shape may be described as a curved piece of material with first planar wing 710 joined to second planar wing 712 by integrally formed curved segment 714. An inside surface of bracket 700, that is the surface facing the acute angle formed by curved segment 714, may have an integrally formed or removably attached boss, such as corner boss 708. Corner boss 708 is sized and dimensioned to form a tension fit within slot 706 of slotted rail 702. Corner boss 710 is shown as being hollow to reduce the weight of corner bracket 700, though in other illustrative embodiments, corner boss 708 may be solid.

FIG. 8 illustrates another view of the monument bracket used in FIG. 7, in accordance with an illustrative embodiment. Thus, reference numerals in common with FIG. 7 share similar functions and descriptions.

In FIG. 8, corner bracket 700 is shown from an opposite side, where the inside surface is facing the reader. Thus, corner boss 708 is shown more clearly in FIG. 8.

Corner boss 708 may have a number of features not visible in FIG. 7. For example, the length of corner boss 708 may be shorter than an overall length of corner bracket 700, and be centered with respect to the overall length of corner bracket 700. In this manner, space 800 may be present on either side of corner boss 708. This space need not be present in other illustrative embodiments.

In addition, corner boss 708 may be provided with one or more indexing features, such as indexing feature 802. An indexing feature is a piece of material on corner boss 708 that extends outwardly away from corner bracket 700 and corner boss 708. As shown in FIG. 8, indexing feature 802 take the form of a short cylinder that is integrally formed with corner boss 708.

Indexing feature 802 may be used to aid in placing and fixing corner bracket 700 within a corresponding hole or indentation disposed inside slot 706 of slotted rail 702. This hole or indentation is not shown in FIG. 7, because it is hidden by the attachment of corner bracket 700 to slotted rail 702, though this hole or indentation may be seen in FIG. 15. Note that while FIG. 8 shows only one indexing feature, multiple indexing features may be present. Additionally, the location of indexing feature 802 may vary on corner boss 708.

Figure 9:
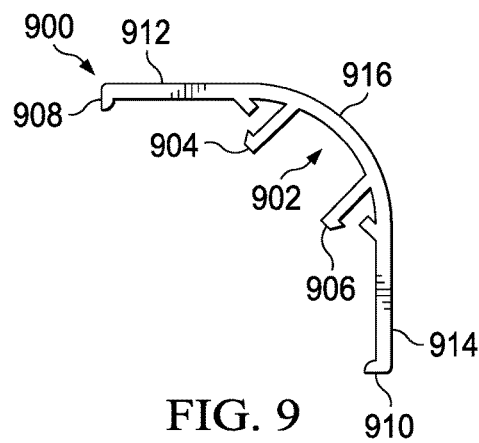
FIG. 9 illustrates a different monument bracket relative to that shown in in FIG. 7, in accordance with an illustrative embodiment.

FIG. 9 illustrates a different monument bracket relative to that shown in in FIG. 7, in accordance with an illustrative embodiment. Specifically, FIG. 9 shows a top-down view of bracket 900. Bracket 900 could also be placed in a rail attached to a corner of a monument, such as for example rail 408 or rail 410 of FIG. 4.

Monument bracket 900 is similar to the brackets described above. However, instead of corner boss 708 shown in FIG. 7, monument bracket 900 may be attached to a rail by means of tension clip 902. Tension clip 902 is formed by two relatively flexible prongs, prong 904 and prong 906. These two prongs fit into receiving ridges that may be added to the sides of the rail attached to the monument. Thus, FIG. 9 illustrates an alternative method of attaching a corner bracket to a rail of a monument.

Bracket 900 may include additional features, if desired. For example, monument bracket 900 may include flange 908 and flange 910. These flanges may help ensure a close fit between monument bracket 900 and the sides of the monument. In an illustrative embodiment, planar section 912 and planar section 914 may be flexible about curved portion 916 such that an appropriate pressure may also be applied to the sides of the monument via flange 908 and flange 910. In this manner, monument bracket 900 may be secured to the monument.

Figure 10:
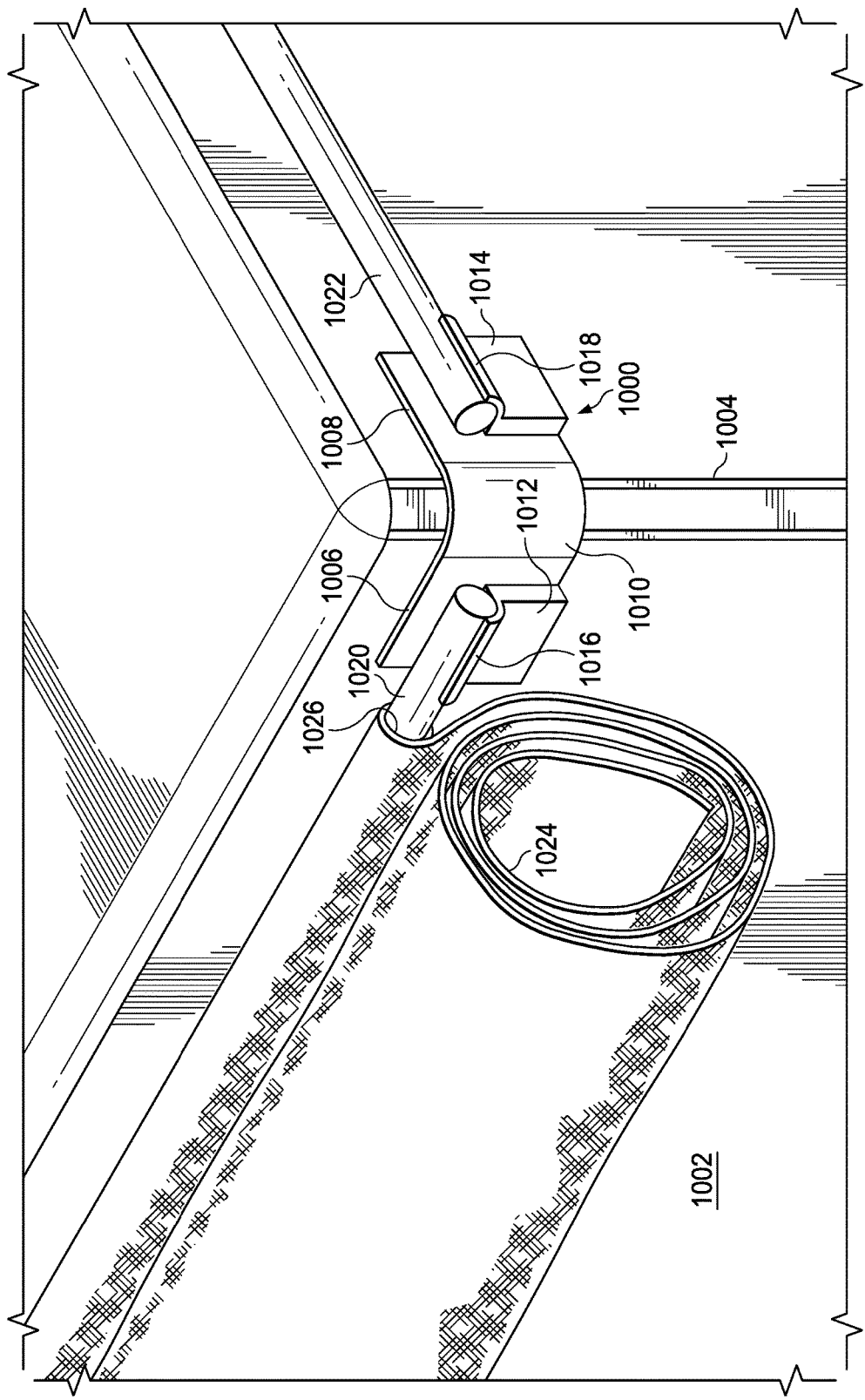
FIG. 10 illustrates still another monument protection system, in accordance with an illustrative embodiment.

FIG. 10 illustrates still another monument protection system, in accordance with an illustrative embodiment. FIG. 10 illustrates a different type of corner bracket, hanging bracket 1000 that may be attached to monument 1002 in order to hang a blanket around a monument. Hanging bracket 1000 may be similar to bracket 404 shown in FIG. 4.

Hanging bracket 1000 is attached to rail 1004 using a method similar to those described above with respect to FIG. 4 through FIG. 9. Hanging bracket 1000 includes planar section 1006, planar section 1008, and curved section 1010. The inside corner boss or tension clip used to secure hanging bracket 1000 to rail 1002 is not shown, as it is located opposite of the outside face of curved section 1010 that is facing the reader.

In the illustrative embodiment shown in FIG. 10, block 1012 extends from the outside face of planar section 1006 and block 1014 extends from the outside face of planar section 1008. Integral with block 1012 is curved rail 1016. Likewise, integral with block 1014 is curved rail 1018. These curved rails may support rods from which blankets may hang. For example, rod 1020 rests in curved rail 1016 and rod 1022 rests in curved rail 1018. The opposite ends of these rods rest in corresponding curved hanging rails on corresponding corner brackets on the corresponding opposite sides of the monument.

As shown in FIG. 10, blanket 1024 hangs from rod 1020. Blanket 1024 is shown as being rolled up and maintained in this state via a hook and loop fastener, not shown, though blanket 1024 may be unrolled and cover most of the remainder of that side of monument 1002. In an illustrative embodiment, rod 1020 may be threaded through loop 1026, which in turn is attached to blanket 1024. In this manner, blanket 1024 may be added to and removed from monument 1002 simply by lifting rod 1020 out of curved rail 1016.

Note that the illustrative embodiment shown in FIG. 10 is not necessarily limiting. As described above, a hook and loop or other fastener system may be attached to an outside face of either planar section of hanging bracket 1000. The blanket may have the opposing face of the hook and loop fastener system. Thus, in some cases, blanket 1024 may be directly attached to hanging bracket 1000 instead of depending from rail 1020. As described below, other variations are possible.

Figure 11:
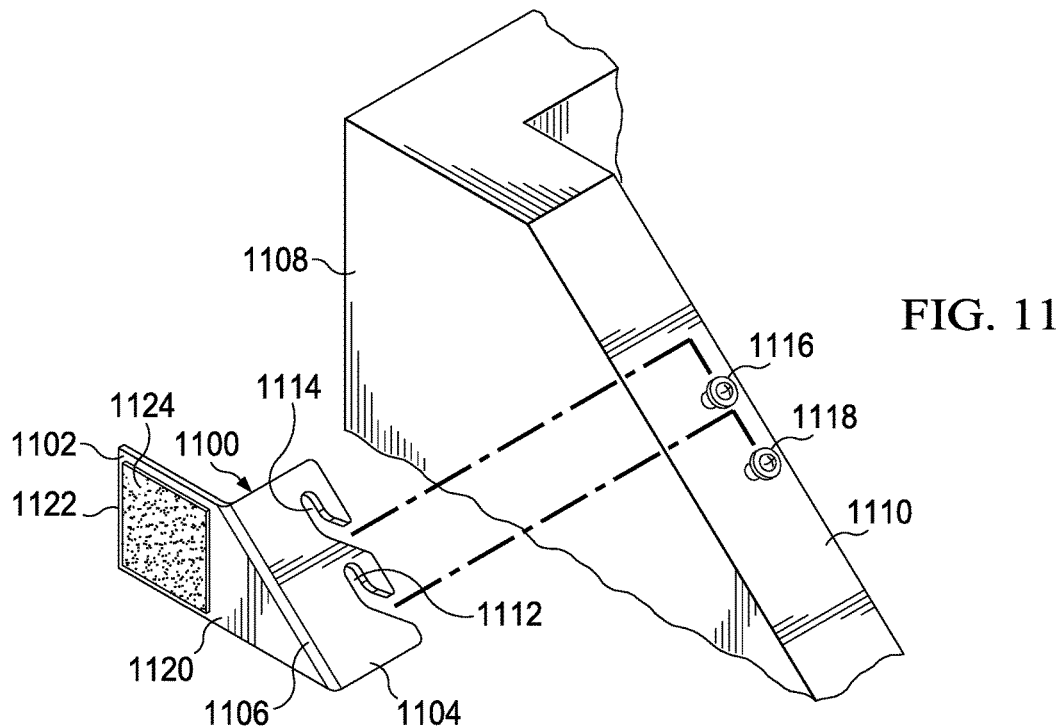
FIG. 11 illustrates still another monument protection system for an angled monument, in accordance with an illustrative embodiment.

FIG. 11 illustrates still another monument protection system for an angled monument, in accordance with an illustrative embodiment. FIG. 11 illustrates that the inside curve of a bracket, such as bracket 1000, need not be uniformly at the same angle along the length of the bracket, such as the brackets shown in FIG. 4 through FIG. 10.

For example, bracket 1100 may include planar section 1102 and planar section 1104; however, corner section 1106 has an angle that broadens along the length of bracket 1100. In this manner, in one orientation, planar section 1102 may be flat relative to the direction of gravity, while planar section 1104 has an angle relative to the direction of gravity but yet still is generally planar in shape. Curved section 1106 is twisted or shaped to accommodate this arrangement of planar sections.

Bracket 1100 is intended to be placed on a different shape of monument relative to the rectangular solid-shaped monuments of FIG. 1 through FIG. 10. Specifically, monument 1108 has a surface 1110 on one or more sides of the monument that is angled with respect to gravity. While FIG. 11 shows surface 1110 as being planar, surface 1110 could also be curved. In this case, the shape of planar section 1106 could be changed to match a shape of the curved shape of surface 1110.

In an illustrative embodiment, bracket 1100 may be attached to monument 1108 via groove 1112 and groove 1114. These grooves may each have an opening and a slot, as shown, in order to receive a corresponding indexing feature placed on surface 1110. Thus, for example, groove 1112 fits into indexing feature 1118 and groove 1114 fits into indexing feature 1116. In this manner, bracket 1100 may be secured to monument 1108 and still present outside surface 1120 in a manner that is aligned with straight side 1122 of monument 1108.

In an illustrative embodiment, first side 1124 of a hook and loop fastener system may be attached to planar section 1102. A blanket, to which is attached a second side of the hook and loop fastener system, may then be attached to planar section 1102 of bracket 1100.

Figure 12:
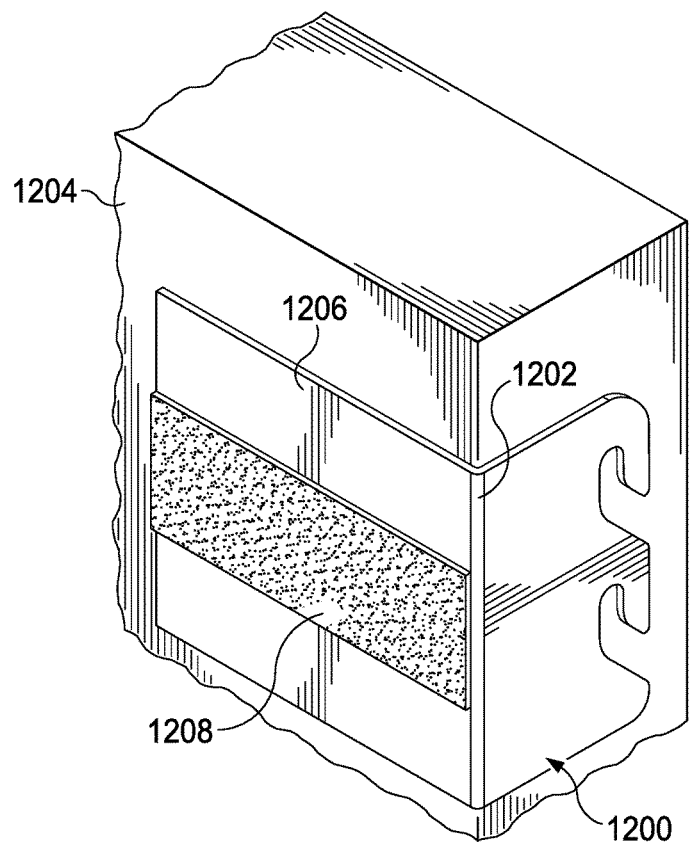
FIG. 12 illustrates another bracket usable in a monument protection, in accordance with an illustrative embodiment.

FIG. 12 illustrates another bracket usable in a monument protection, in accordance with an illustrative embodiment. Bracket 1200 shows an alternative shape to a bracket usable on an angled surface of a monument, relative to bracket 1100 of FIG. 11.

Bracket 1200 has two straight planar sections, similar to bracket 700 of FIG. 7. However, in this case, curved section 1202 is instead about at a ninety degree angle. Bracket 1200 thus may fit around a sharp, about ninety-degree corner of monument 1204, to which attachment of a slotted rail may be inconvenient or impractical. Again, outer face of planar section 1206 may include first side 1208 of a hook and loop fastener system for attachment to a second side of the hook and loop fastener system attached to a blanket (not shown).

Figure 13:
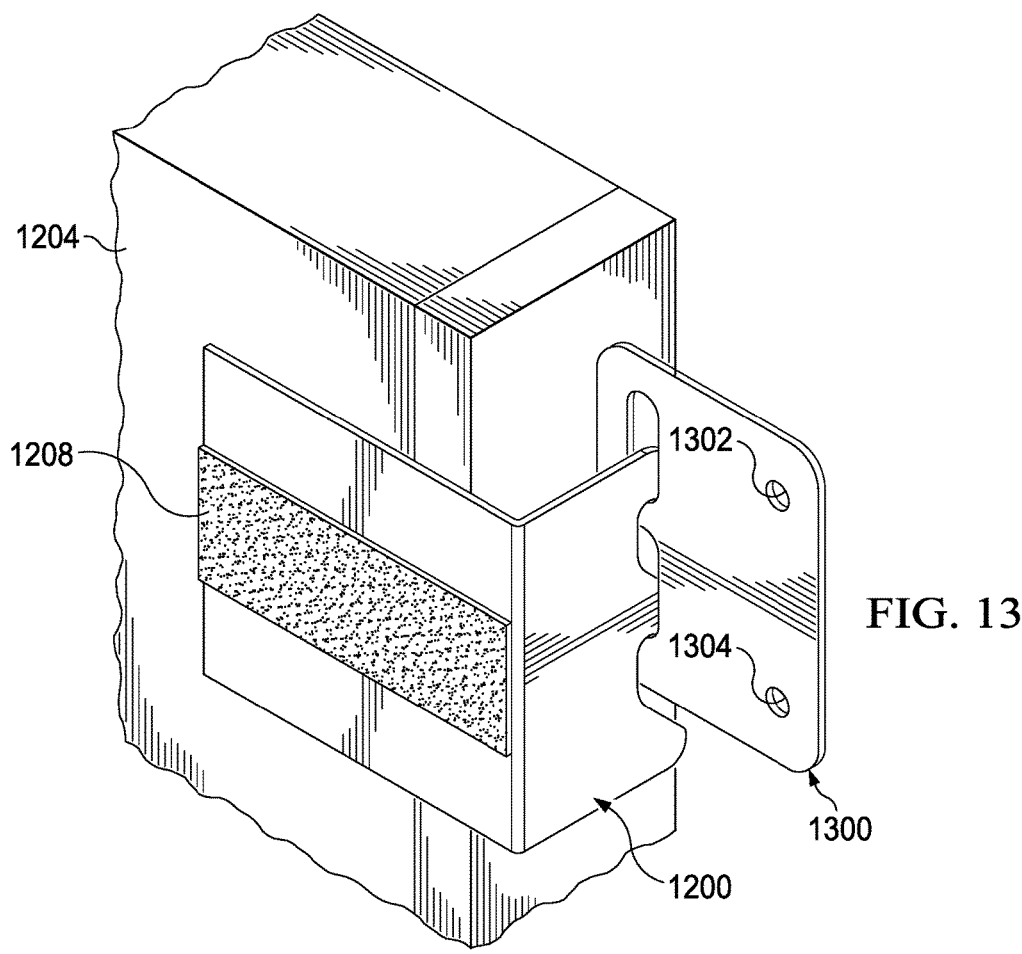
FIG. 13 illustrates another view of the bracket used in the monument protection system shown in FIG. 12, in accordance with an illustrative embodiment.
Figure 14:
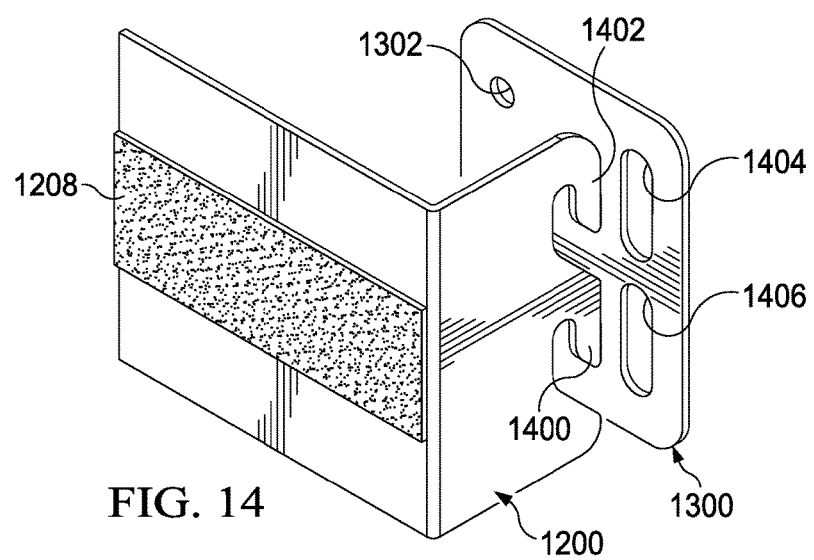
FIG. 14 illustrates still another view of the bracket used in the monument protection system shown in FIG. 12, in accordance with an illustrative embodiment.

FIG. 13 and FIG. 14 illustrate different perspectives of bracket 1200 of FIG. 12. FIG. 13 and FIG. 14 further illustrate a method of attaching bracket 1200 to monument 1204.

Thus, FIG. 13 illustrates another view of the bracket used in the monument protection system shown in FIG. 12, in accordance with an illustrative embodiment. Likewise, FIG. 14 illustrates still another view of the bracket used in the monument protection system shown in FIG. 12, in accordance with an illustrative embodiment. Reference numerals in FIG. 13 and FIG. 14 in common with FIG. 12 have similar descriptions and functions.

Bracket 1200 may be provided with slots, similar to those of bracket 1100 of FIG. 11, forming hook 1400 and hook 1402. In this illustrative embodiment, additional brace plate 1300 is provided. Brace plate 1300 may be provided with slot 1404 and slot 1406 for receiving hook 1400 and hook 1402, respectively. Brace plate 1300 may also be provided with fastener hole 1302 and fastener hole 1304.

In use, brace plate 1300 may be attached to a side monument 1204 via fastener hole 1302 and fastener hole 1304. Alternatively, pegs, bosses, or indexing features in monument 1204 may be placed into fastener hole 1302 and fastener hole 1304 to secure brace plate 1300 to monument 1204. Then, hook 1402 fits into slot 1404 and hook 1400 fits into slot 1406. The size and dimensions of the hooks and slots may be specified in order to create a tension fit between bracket 1200 and brace plate 1300, thereby securing bracket 1200 to monument 1204. Thereafter, a blanket may be attached to first side 1208 of a hook and loop fastener system, as described above.

Figure 15:
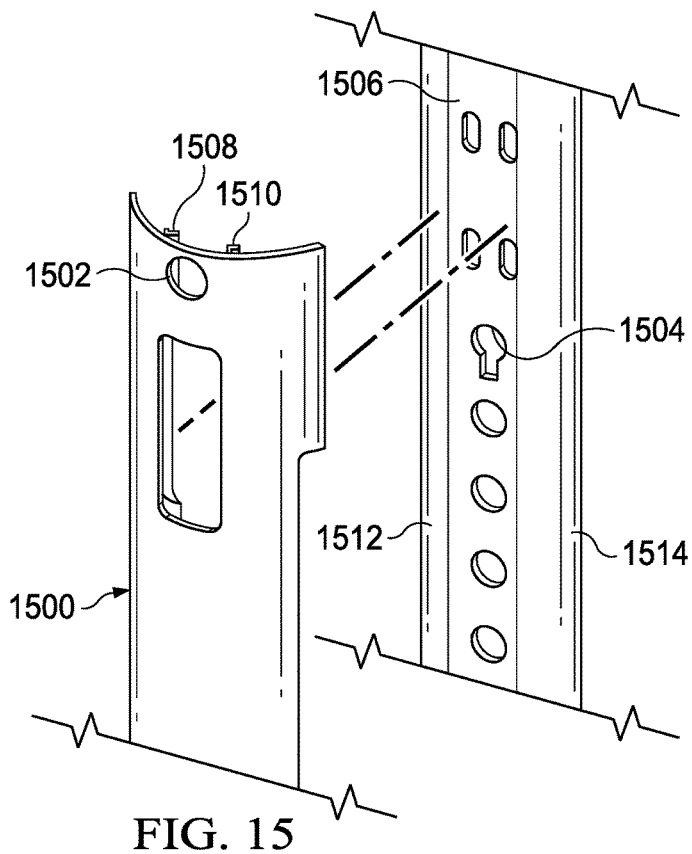
FIG. 15 illustrates another example of a different bracket useable in a monument protection system, in accordance with an illustrative embodiment.

FIG. 15 illustrates another example of a different bracket useable in a monument protection system, in accordance with an illustrative embodiment. FIG. 15 also shows the details of indexing features, such as indexing feature 802 of FIG. 8. Thus, for example, indexing feature 1500 of FIG. 15 may correspond to indexing feature 802 of FIG. 8 and may be used to aid in placing and fixing corner bracket 700 within a corresponding hole or indentation disposed inside slot 706 of slotted rail 702, with respect to FIG. 7.

Bracket 1500 has a different shape from the brackets shown in FIG. 4 through FIG. 14. In particular, bracket 1500 has a curved shape about both its inside and outside surfaces. Bracket 1500 may include indexing feature 1502, shown as a cut-away in the outside surface of bracket 1500. Indexing feature 1502 may fit into hole 1504 of rail 1506. Bracket 1500 may also include prong 1508 and prong 1510 which fit within corresponding side 1512 and side 1514 of rail 1506.

Again, outside surface of bracket 1500 may include a first side of a hoop and loop fastener system, as described above. In this manner, a blanket having a second side of the hook and loop fastener system may be attached to bracket 1500.

Figure 16:
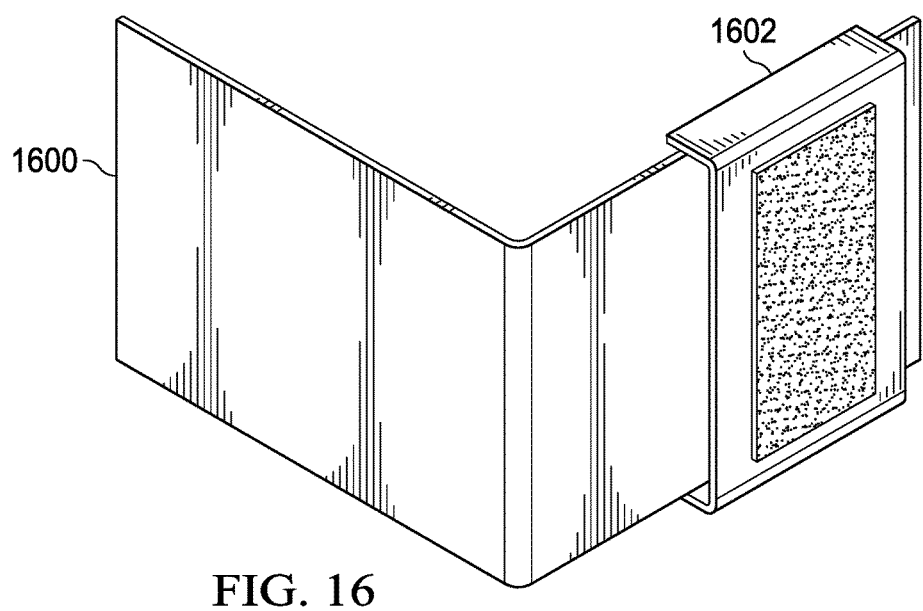
FIG. 16 illustrates a still different bracket used in a monument protection system, in accordance with an illustrative embodiment.

FIG. 16 illustrates a still different bracket used in a monument protection system, in accordance with an illustrative embodiment. Bracket 1600 may include cornered lip 1602 which hangs from one side of bracket 1600. Cornered lip 1602 may include on an outwardly facing side a first side of a hook and loop fastener system. Bracket 1600 may then be connected to a corner of a monument by one of the methods described above, and a blanket having a second side of the hook and loop fastener system attached to cornered lip 1602. Cornered lip 1602 can also be used to accept a rail similar to groove 600 or slot 606 of FIG. 6, or slot 1706 or slot 1708 of FIG. 17.

Figure 17:
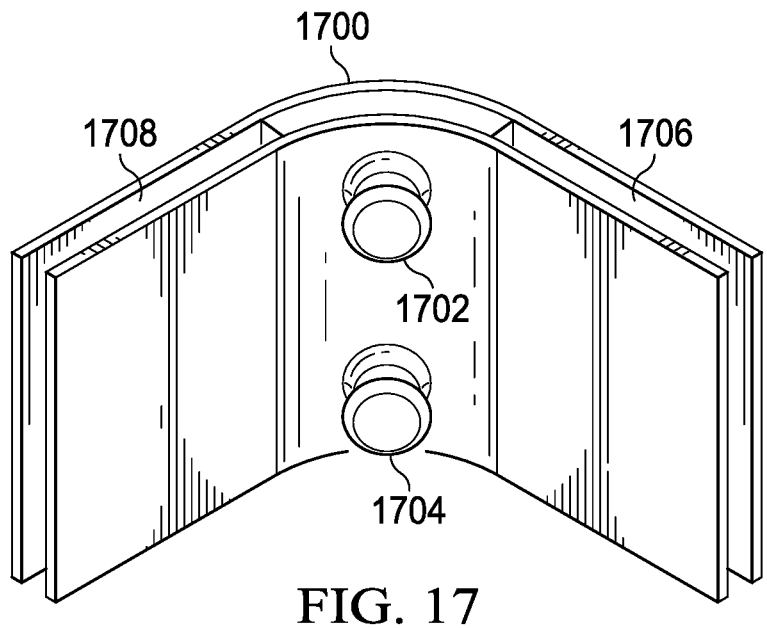
FIG. 17 illustrates yet another bracket used in a monument protection system, in accordance with an illustrative embodiment.

FIG. 17 illustrates yet another bracket used in a monument protection system, in accordance with an illustrative embodiment. Bracket 1700 may be similar to bracket 700 shown in FIG. 7 and FIG. 8 or bracket 514 shown in FIG. 6. However, bracket 1700 shows two indexing features instead of 1: indexing feature 1702 and indexing feature 1704. Additionally, bracket 1702 shows an example of slot 1706 and slot 1708, which may be for example slot 606 or slot 600 shown in FIG. 6. These slots may receive a rail, such as for example rail 540 shown in FIG. 5 and FIG. 6.

Figure 18:
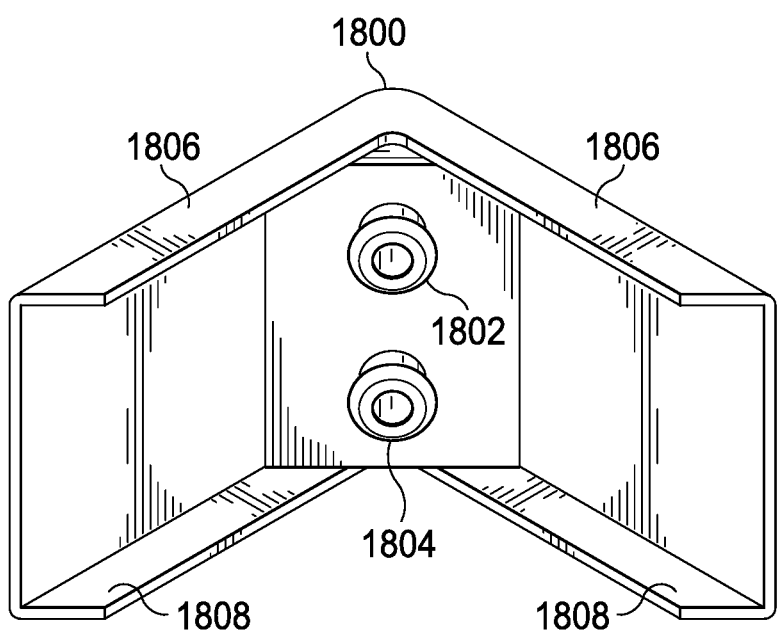
FIG. 18 illustrates still another bracket used in a monument protection system, in accordance with an illustrative embodiment.

FIG. 18 illustrates still another bracket used in a monument protection system, in accordance with an illustrative embodiment. Bracket 1800 may be a variation of bracket 900 shown in FIG. 9, shown from a different perspective. Like bracket 1700 of FIG. 17, bracket 1800 includes two indexing features, indexing feature 1802 and indexing feature 1804. Bracket 1800 also includes flanges, including flange 1806 and flange 1808. Bracket 1800 may be included in some illustrative embodiments to fit over the rail in the corner of the monument. The indexing features will connect to holes in the slot of the rail in this illustrative embodiment, thereby securing bracket 1800 to the monument.

Figure 19:
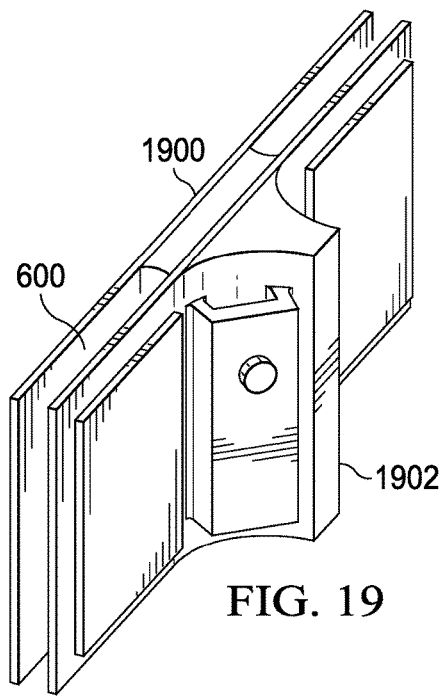
FIG. 19 illustrates still another bracket used in a monument protection system, in accordance with an illustrative embodiment.

FIG. 19 illustrates still another bracket used in a monument protection system, in accordance with an illustrative embodiment. Bracket 1900 may correspond to longitudinal bracket 536 shown in FIG. 5 and FIG. 6. Bracket 1900 may include triangular boss 1902 which extends into a space created by two railed corners of two monuments, such as is shown in FIG. 6. A perspective of slot 600 is also shown.

Figure 20:
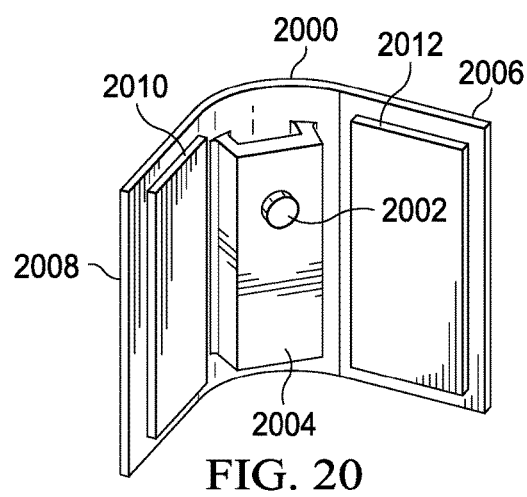
FIG. 20 illustrates still another bracket used in a monument protection system, in accordance with an illustrative embodiment.

FIG. 20 illustrates still another bracket used in a monument protection system, in accordance with an illustrative embodiment. Bracket 2000 may be a variation of bracket 700 shown in FIG. 7 and FIG. 8. In this illustrative embodiment, bracket 2000 includes indexing feature 2002 in an upper center portion of boss 2004. Also, if desired depending on the shape of the monument, the inside faces of planar section 2006 and planar section 2008 may include mesa 2010 and mesa 2012. These mesas are raised portions disposed on or integral with the planar sections to aid in fitting bracket 2000 onto the monument.

Figure 21:
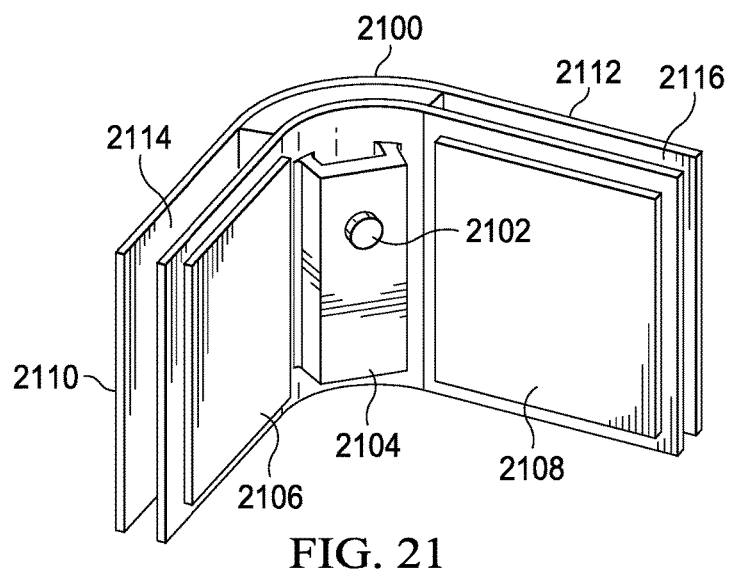
FIG. 21 illustrates still another bracket used in a monument protection system, in accordance with an illustrative embodiment.

FIG. 21 illustrates still another bracket used in a monument protection system, in accordance with an illustrative embodiment. Bracket 2100 is a variation of bracket 1700 shown in FIG. 17. Like bracket 2000 of FIG. 20, bracket 2100 may include indexing feature 2102 on boss 2104. Additionally, mesa 2106 and mesa 2108 may be included on the corresponding inside faces of planar section 2110 and planar section 2112. These planar sections may also include corresponding slot 2114 and slot 2116 in order to accommodate a rail, such as shown in FIG. 6 and also in FIG. 22, below.

Figure 22:
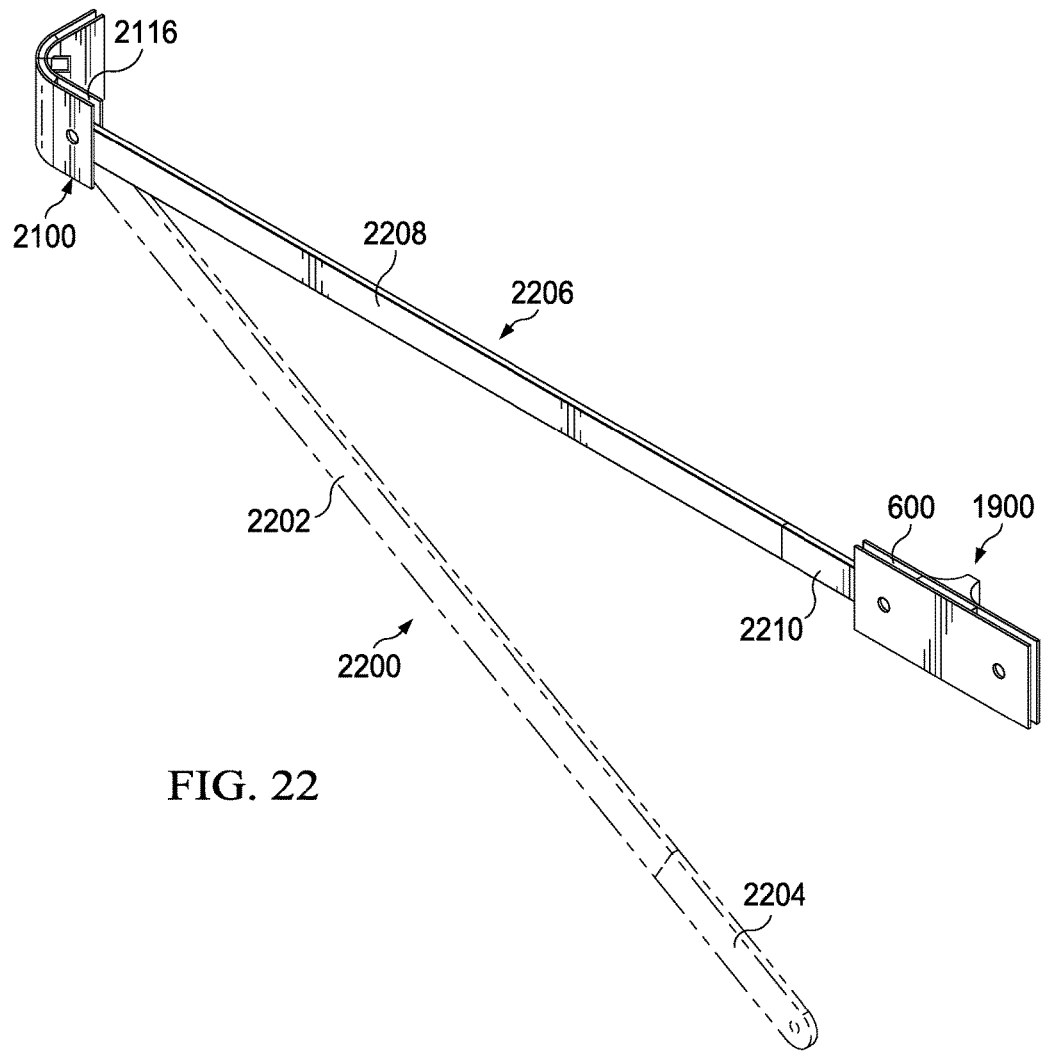
FIG. 22 illustrates an example of use of the brackets shown in FIG. 19, FIG. 20, and FIG. 21, in accordance with an illustrative embodiment.

FIG. 22 illustrates an example of use of the brackets shown in FIG. 19, FIG. 20, and FIG. 21, in accordance with an illustrative embodiment. Thus, reference numerals common to these figures refer to similar objects and have similar descriptions.

In an illustrative embodiment, bracket 2100 is attached to a corner of a first monument and bracket 1900 is disposed at a juncture between the first monument and a second monument. This arrangement may be seen in FIG. 6.

Rail 2200 may then be inserted into slot 2116 of bracket 2100. Rail 2200 may be rail 540 shown in FIG. 5 and FIG. 6. Rail 2200 is shown in phantom to indicate that the position of rail 2200 is an intermediate step installing bracket 2100 and bracket 1900 on the first and second monuments. Note that rail 2200 may include rail section 2202 and rail section 2204. These two rail sections may be slidable with respect to each other in order to more easily accommodate the distance between bracket 2100 and bracket 1900, which is fixed by the width of the monument between them.

In use, rail 2200 may be twisted through an angle until it is straight, as shown by the position of rail 2206. The opposite end of rail 2206 is inserted into slot 600 of bracket 1900. Note that rail 2206 is rail 2200, just in a horizontal position between bracket 2100 and bracket 1900. Thus, rail section 2208 corresponds to rail section 2202 and rail section 2210 corresponds to rail section 2204.

One or more of the outside faces of bracket 2100, rail 2206, or bracket 1900 may have disposed on them a first side of a hook and loop fastener system, as described above. Thus, a blanket having a second side of the hook and loop fastener system may be attached to any of these objects and thereby be hung from a monument to which the brackets and rail are attached.

Figure 23:
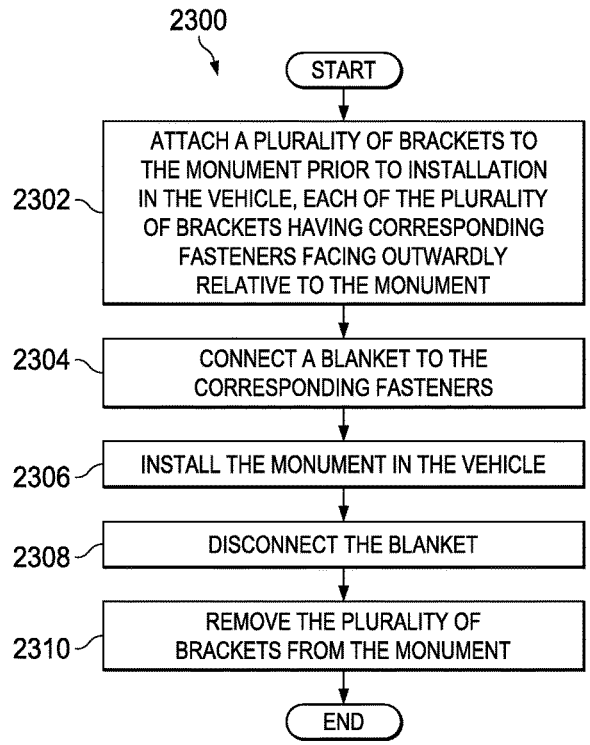
FIG. 23 is a flowchart of a method of protecting a monument during manufacturing of a vehicle, in accordance with an illustrative embodiment.

FIG. 23 is a flowchart of a method of protecting a monument during manufacturing of a vehicle, in accordance with an illustrative embodiment. Method 2300 may be implemented using a monument installation system using brackets and/or rails, such as described above with respect to FIG. 1 through FIG. 22. Method 2300 may be characterized as a method of protecting a monument during manufacturing of a vehicle.

Method 2300 may include attaching a plurality of brackets to the monument prior to installation in the vehicle, each of the plurality of brackets having corresponding fasteners facing outwardly relative to the monument (operation 2302). The term "facing outwardly" means that the fasteners are on a side not facing the monument and are also pointing away from the monument. An example of a fastener facing away from a monument is at least one half of a hook and loop fastener system that is disposed on a first side of the bracket opposite a second side of the bracket that abuts the monument. Another example may be a button or other projection that is disposed on a first side of the bracket opposite a second side of the bracket that abuts the monument. Other examples are possible.

Method 2300 may also include connecting a blanket to the corresponding fasteners (operation 2304). Method 2300 may also include installing the monument in the vehicle (operation 2306); disconnecting the blanket (operation 2308); and removing the plurality of brackets from the monument (operation 2310). The method may terminate thereafter.

Method 2300 may be varied. For example, the corresponding fasteners may be corresponding first sides of a hook and loop fastener system. In this case, a second side of the hook and loop fastener system is attached to the blanket.

In another illustrative embodiment, method 2300 may include, after removing the plurality of brackets, installing a decorative object in place of the plurality of brackets. Method 2300 may also include installing a modular link to at least one of the plurality of brackets.

In another illustrative embodiment, method 2300 may also include that the modular link is connected to at least two of the plurality of brackets. In this case, at least one of the first sides of the hook and loop system is connected to the modular link, and connecting the blanket includes connecting the second side to the modular link.

In another illustrative embodiment, method 2300 may also include, after removing the plurality of brackets, attaching the plurality of brackets to the a second monument prior to installation in the vehicle, each of the plurality of brackets having corresponding fasteners facing outwardly relative to the second monument. In this case, method 2300 may also include connecting the blanket to the corresponding fasteners; installing the second monument in the vehicle; disconnecting the blanket; and removing the plurality of brackets from the second monument.

In another illustrative embodiment, method 2300 may also include that the monument is a pre-fabricated modular structure to be installed in the vehicle. In another illustrative embodiment, method 2300 may also include that the vehicle is an aircraft. In this case, the monument may be selected from the group consisting of: a galley, a closet, a lavatory, and a bin.

In another illustrative embodiment, method 2300 may also include that the plurality of brackets include a first bracket installable on a corner of the monument. The first bracket may be two straight sections joined by a curved section. The first bracket may include an indexing feature disposed on an inside of the curved section, and two corresponding hanging features disposed at a first edge of the first bracket. In this case, attaching the plurality of brackets may be attaching the indexing feature to a connection mount disposed on a corner of the monument.

In the above example, method 2300 may further include connecting a second bracket to the second monument. The second bracket may include two additional straight sections joined by an additional curved section, an additional indexing feature disposed on an inside of the additional curved section, and two corresponding additional hanging features disposed at an additional first edge of the second bracket. In this case, attaching the plurality of brackets may include attaching the additional indexing feature to an additional connection mount disposed on an additional corner of the second monument; and hanging a second blanket on the second bracket.

In another illustrative embodiment, method 2300 may also include that the first monument and the second monument are adjacent. In this case, method 2300 may further include connecting a third bracket in the plurality of brackets between the monument and the second monument. The third bracket may be a panel, and an indexing feature extends from a side of the panel. Further, in this case, method 2300 may include placing the third bracket between the monument and the second monument; connecting a first link between the first bracket and the third bracket; and connecting a second link between the second bracket and the third bracket.

Figure 24:
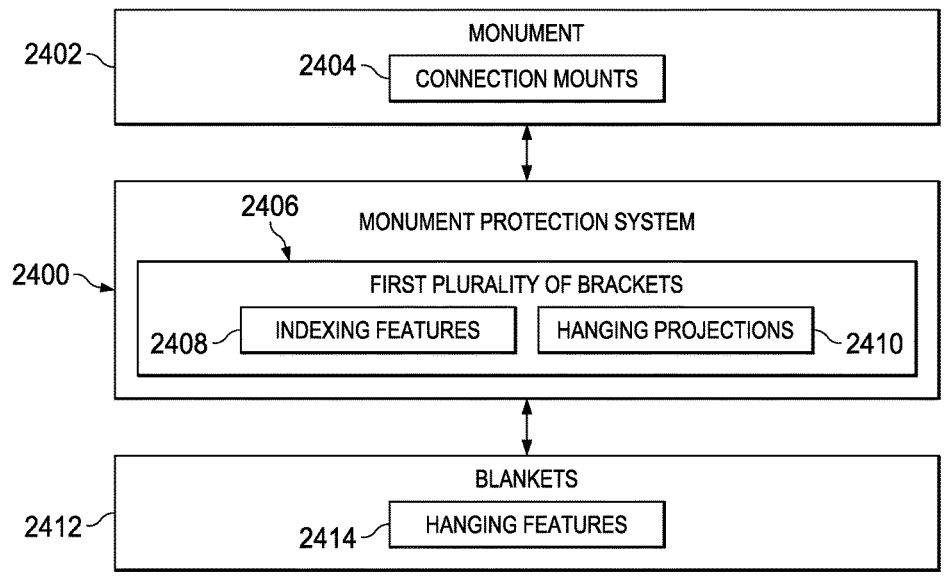
FIG. 24 is a block diagram of a monument protection system, in accordance with an illustrative embodiment.

FIG. 24 is a block diagram of a monument protection system, in accordance with an illustrative embodiment. Monument protection system 2400 may be a variation of any of the monument protection systems described with respect to FIG. 1 through FIG. 22.

Monument protection system 2400 may be installable on monument 2402 that includes connection mounts 2404. Connection mounts may be, for example, the rails described above. Monument 2402 may be installable as a structure in an aircraft.

Monument protection system 2400 may include first plurality of brackets 2406 installable on corresponding ones of connection mounts 2404. First plurality of brackets 2406 may include corresponding indexing features 2408 installable into corresponding ones of connection mounts 2404. First plurality of brackets 2406 further may include corresponding hanging projections 2410 configured to hang blankets 2412. Corresponding hanging projections 2410 may be disposed opposite corresponding indexing features 2408 relative to each other.

Monument protection system 2400 may also include blankets 2412. Blankets 2412 may include corresponding hanging features 2414 on corresponding edges of the plurality of blankets. Hanging features 2414 may be connectable to corresponding hanging projections 2410.

Monument protection system 2400 may be further varied. For example, monument protection system 2400 may also include that the connection mounts are rails disposed on corners of the monument. In this case, the corresponding indexing features may be corresponding bosses that fit into the rails.

In further example, monument protection system 2400 may also include that the corresponding bosses are a corresponding hanging projection extending from the corresponding bosses. In this case, the corresponding hanging projection is connectable into holes disposed in the rails in the monument.

In a different example, monument protection system 2400 may also include that the first plurality of brackets includes a first bracket. The first bracket may be two straight sections joined by a curved section, an indexing feature disposed on an inside of the curved section, and two corresponding hanging features disposed at a first edge of the first bracket.

In a different example, monument protection system 2400 may also include a second plurality of brackets installable between the monument and an adjacent second monument. In this case, monument protection system 2400 may further include a plurality of links removably attachable to both the first plurality of brackets and the second plurality of brackets. Still further, monument protection system 2400 may also include a third plurality of brackets attachable to the second monument and to the plurality of links.

In a different example, monument protection system 2400 may also include that the hanging projections comprise rails. In this case, the hanging features may be rods insertable into the rails.

In a different example, monument protection system 2400 may also include that the hanging projections comprise first sides of a hook and loop fastening system. In this case, the hanging features may be second sides of the hook and loop fastening system.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A monument of protecting a monument during installation of the monument in a vehicle, the method comprising the following steps in the sequence of:
A) attaching a plurality of brackets to the monument prior to installation in the vehicle, each of the plurality of brackets having corresponding fasteners facing outwardly relative to the monument;
B) connecting a blanket to the corresponding fastener to protect the monument thereby forming a protected monument;
C) installing the protected monument in the vehicle;
D) disconnecting the blanket from the corresponding fasteners; and
E) removing the blanket and the plurality of brackets from the monument.

2. The method of claim 1, wherein the corresponding fasteners are corresponding first sides of a hook and loop fastener system, and wherein a second side of the hook and loop fastener system is attached to the blanket.

3. The method of claim 1 further comprising:
after removing the plurality of brackets, installing a decorative object in place of the plurality of brackets.

4. The method of claim 1,
wherein attaching the plurality of brackets to the monument includes the plurality of brackets attached to a slotted connection mount on the monument.

5. The method of claim 2, further comprising:
installing a rail to at least two brackets of the plurality of brackets;
wherein at least one of the corresponding first sides of the hook and loop system is connected to the rail, and wherein connecting the blanket includes connecting the corresponding second side to the rail.

6. The method of claim 1 further comprising:
F) after removing the blanket and the plurality of brackets, attaching the plurality of brackets to a second monument prior to installation in the vehicle, each of the plurality of brackets having corresponding fasteners facing outwardly relative to the second monument;
G) connecting the blanket to the corresponding fasteners thereby forming a protected second monument;
H) installing the protected second monument in the vehicle;
I) disconnecting the blanket; and
J) removing the blanket and the plurality of brackets from the second monument.

7. The method of claim 1, wherein the monument comprises a pre-fabricated modular structure to be installed in the vehicle.

8. The method of claim 7, wherein the vehicle is an aircraft, and wherein the monument is selected from the group consisting of: a galley, a closet, a lavatory, and a bin.

9. The method of claim 1, wherein the plurality of brackets include a first bracket installable on a corner of the monument, the first bracket comprising two straight sections joined by a curved section, an indexing feature disposed on an inside of the curved section, and wherein attaching the plurality of brackets comprises attaching the indexing feature to a connection mount disposed on a corner of the monument.

10. The method of claim 9, wherein the monument is a first monument and wherein the method further comprises:
- connecting a second bracket to a second monument, the second bracket comprising two additional straight sections joined by an additional curved section, an additional indexing feature disposed on an inside of the additional curved section, and wherein attaching the plurality of brackets comprises attaching the additional indexing feature to an additional connection mount disposed on an additional corner of the second monument; and
- hanging a second blanket on the second bracket.

11. The method of claim 10, wherein the first monument and the second monument are adjacent, and wherein the method further comprises:
- connecting a third bracket in the plurality of brackets between the monument and the second monument;
- connecting a first rail between the first bracket and the third bracket; and
- connecting a second rail between the second bracket and the third bracket.

* * * * *